United States Patent Office.

WALDRON J CHEYNEY, OF WALLINGFORD, AND EMIL F. DIETERICHS, OF PHILADELPHIA, PENNSYLVANIA.

Letters Patent No. 69,317, dated October 1, 1867.

IMPROVEMENT IN THE MANUFACTURE OF DRESS-TRIMMINGS.

The Schedule referred to in these Letters Patent and making part of the same.

TO ALL WHOM IT MAY CONCERN:

Be it known that we, WALDRON J. CHEYNEY, of Wallingford, Delaware county, State of Pennsylvania, and EMIL F. DIETERICHS, of the city and county of Philadelphia, State of Pennsylvania, have invented a new and useful Improvement in Dress-Trimmings; and we do hereby declare that the following is a full and exact description of the same.

Our invention is a new manufacture, and consists of bugles, beads, or buttons, of any desired shape or size, either hollow or solid, made of a vitreous porcelain, composed of cryolite or its chemical equivalents, and silica.

The following proportions we have found to answer well for the purpose, although they may be varied without material detriment: Fifty pounds of sand, (silicious,) twenty-five pounds of powdered cryolite.

These materials are fused together in a crucible, in a glass furnace, and may be worked out either by being blown or pressed, as desired.

Having thus described our invention, we claim, and desire to secure by Letters Patent, as a new manufacture—

Bugles, beads, or buttons, made of cryolite or its chemical equivalents, fused with silica, and worked substantially in the manner and for the purpose described.

WALDRON J. CHEYNEY,
E. F. DIETERICHS.

Witnesses:
   GEO. E. BUCKLEY,
   A. R. REESE.